United States Patent Office 3,415,766
Patented Dec. 10, 1968

3,415,766
COATING COMPOSITIONS COMPRISING IN COMBINATION A SICCATIVE ORGANIC COATING COMPOSITION AND A PHOSPHORUS-CONTAINING COMPOSITION
Woodrow W. Jedlicka, Euclid, Ohio, assignor to The Lubrizol Corporation, Wickliffe, Ohio, a corporation of Ohio
No Drawing. Continuation-in-part of application Ser. No. 301,588, Aug. 12, 1963. This application Dec. 9, 1966, Ser. No. 600,353
9 Claims. (Cl. 260—22)

ABSTRACT OF THE DISCLOSURE

The combination of a siccative material and a minor proportion of the product of the reaction of a benzene polycarboxylic reactant, a polyhydroxy compound and phosphorus pentoxide, phosphoric acid or a mixture thereof, provides protection from corrosion when applied to a metal surface as a film. This combination is especially effective for the protection of aluminum surfaces. Further, the above reaction product itself provides good protective films on metal surfaces, especially aluminum surfaces. Such films may be deposited by any of the usual methods, e.g., from solutions in volatile solvents.

---

This application is a continuation-in-part of co-pending application Ser. No. 301,588 filed Aug. 12, 1963, now abandoned.

This invention relates to novel phosphorus-containing compositions suitable for use in providing protective films for metal surfaces. It also relates to processes by which such compositions are prepared and processes by which such compositions are applied to metal surfaces to form protective films.

The corrosion of metal articles is of obvious economic significance in many industrial applications and, as a consequence, the inhibition of such corrosions is a matter of prime consideration. It is particularly significant to users of steel and other ferrous alloys. The corrosion of such ferrous metal alloys is largely a matter of rust formation, which in turn involves the overall corrosion of the free metal to its oxide.

The theory which best explains such oxidation of ferrous metal surfaces postulates the essential presence of both water and oxygen. Even minute traces of moisture are sufficient, according to this theory, to induce the dissolution of iron therein and the formation of ferrous hydroxide until the water becomes saturated with ferrous ions. The presence of oxygen causes oxidation of the resulting ferrous hydroxide to ferric hydroxide which then settles out of solution and is ultimately converted to ferric oxide or rust.

The above sequence of reactions can be prevented, or at least in large measure inhibited, by relatively impermeable coatings which have the effect of excluding moisture and/or oxygen from contact with the metal surface. Such coatings are often exposed to high humidity, corrosive atmospheres, etc., and to the extent that these coatings are penetrated or otherwise harmed by such influences they become ineffective for the desired purpose. It is also important that such coatings adhere tightly to the metal surface and resist flaking, crazing, blistering, powdering, and other forms of loss of adhesion. A satisfactory corrosion-proofing coating, then, must have the ability to resist weathering, high humidity, and corrosive atmospheres such as salt-laden mists or fogs, air contaminated with industrial wastes, etc.

Various derivatives of acid esters of phosphoric or phosphorothioic acids have been investigated by the workers engaged in the task of providing protective coatings for metals. In U.S. Patent 2,080,299, for example, Benning et al. propose the treatment of ferrous metals with phosphate acid esters of their alkali metal or ammonia salts to prevent rusting. Somewhat similarly, Butler and LeSeur (U.S. Patents 2,861,907 and 2,820,723) find that salt-esters of complex phosphorothioic acids are effective in preventing or retarding the corrosion of metals.

Although such known derivatives of phosphoric and phosphorothioic acids have provided means for combating the corrosion of metals they have not been completely satisfactory because of certain inherent shortcomings. The simple salt-esters of phosphoric acid are regularly washed and abraded from a metal surface and thus provide complete protection only in a favorable environment. The salt-esters of phosphorothioic acids, on the other hand, have a disadvantage, under certain conditions, of developing an objectionable odor reminiscent of hydrogen sulfide, particularly when a film of such a salt-ester comes in contact with water or a humid atmosphere.

A further disadvantage of these known derivatives of phosphoric and phosphorothioic acids is that they form oily or tacky coatings which are not susceptible to the subsequent application of top-coats of siccative organic coating compositions such as paint, varnish, lacquer, enamel, primers, synthetic resins, and the like. Thus, their use has been limited to metal articles such as bulk castings, metal fasteners, fire arm parts, arm cables, etc., which do not require a dry-film protective coating.

Although known, siccative, organic coating compositions have been useful in protecting metal articles against corrosion, the degree of protective in many instances has been less than desired. In humid, corrosive environments, films of such known coating compositions generally exhibit a tendency to separate from the metal substrate and thus expose such substrate to corrosion. In an effort to improve adhesion and corrosion resistance of known siccative organic coating composition, workers in the field of protective coatings have investigated various chemical pretreatments for metal articles including metal passivating solutions, aqueous phosphating solutions, and the like. Although successful in some instances, they have not significantly improved adhesion of a film of a siccative organic coating composition to a galvanized metal article. Thus, it is common knowledge in the metal finishing industry that paints, enamels, etc., adhere very poorly to galvanized metal articles.

It is, therefore, an object of this invention to provide new phosphorus-containing compositions.

Another object of this invention is to provide methods for producing novel phosphorus-containing compositions.

Another object of this invention is to provide new corrosion-preventing coating compositions for metals.

Another object of this invention is to provide new corrosion-preventing additives for siccative organic coating compositions.

Another object of this invention is to provide coated metal articles.

These and other objects are accomplished by providing a phosphorus-containing composition prepared by the process comprising heating at a temperature of at least about 50° C. a mixture comprising from about 1 to about 15 moles of a benzene polycarboxylic reactant having at least two carboxylic groups selected from the class consisting of acid and anhydride groups; from about 1 to about 15 moles of a poly-hydroxy compound selected from the class consisting of polyhydric alcohols and polyhydric phenols; and about 1 mole of a phosphorus acid reactant selected from the group consisting of phosphorus pentoxide, phosphoric acid, and mixtures thereof.

The process of this invention may be carried out simply by mixing and heating the three indicated reactants at a temperature of at least about 50° C. Likewise, the compositions of this invention may be produced by combining any two of the three indicated ingredients to form an intermediate and finally reacting the intermediate with the remaining third reactant. The final reactions, including the simultaneous chemical combination of all three indicated reactants, are accomplished by heating the reaction mixtures at from about 50° C. to about 200° C. for about 1–24 hours. Ordinarily, the benzene polycarboxylic reactant and the poly-hydroxy compound are initially mixed, optionally reacted, mixed with the phosphorus acid reactant, and the whole is heated preferably at a temperature of from about 100° C. to about 175° C. for 1.5–15 hours. When phosphorus pentoxide is to be added to the reaction mixture, the temperature of the reaction mixture should initially be less than about 100° C. to avoid undue scorching of the final product.

The use of a solvent for the reaction mixtures is contemplated and is especially desirable in many instances. A solvent may be used to insure the ready mixing of the reactants during reaction and aids in the deposit of a thin uniform residual film of the reaction product on metal surfaces when such reaction products are to be used as paint base coatings or as protective coatings. Solvents useful in this respect include hydrocarbon solvents, such as xylene and mineral spirits, as well as the oxygenated solvent, such as methyl isobutyl ketone, isobutyl alcohol, and butyl Cellosolve.

Water is a by-product of the process of this invention. Water formation may be noted during the simultaneous reaction of all three components during intermediate formation and during the final reaction of any given intermediate with the corresponding remaining third reactant. Separation of water from the reaction mass finally or at an intermediate stage is not a critical requirement in the production of the compositions of this invention. That is, useful products are produced regardless of whether or not the water is removed. In many instances, however, water removal is used as a means of determining the progress of the reaction. In some instances, e.g., where the final composition is to be used as an air dry type coating, water removal is often desirable.

The benzene polycarboxylic reactant contains at least two carboxylic groups selected from the class consisting of acid and anhydride groups. These include trimellitic acid, hemimellitic acid, trimesic acid, terephthalic acid, m-phthalic acid, 1,2,3,4-benzene tetracarboxylic acid, o-phthalic acid, and the anhydrides of one or more moles thereof. These anhydrides, as indicated, may be polymeric or monomeric. Of these, trimellitic anhydride ($C_9H_4O_5$), a monomeric type, is preferred because of its general availability and relatively low cost. Molar ratios referred to herein are based on the monomeric structure.

The poly-hydroxy compounds may be alcoholic or phenolic. They include compounds containing from 2 to about 6 hydroxyl radicals. The hydrocarbon residue may contain other radicals which are inert for the purposes of this invention, such as, halo, nitro, ether (including polyether), thioether, ester (including esters of carboxylic acids and carbamic acids) and other radicals. Included in this class are polyhydric phenols and polyhydric alcohols such as diols, triols, tetritols, penitols, hexitols, or other higher polyhydric alcohols or phenols. They include, for example, catechol, resorcinol, and hydroquinone, ethylene glycol, propylene glycol, trimethylene glycol, 1,2-propanediol, 1,3-propanediol, 1,3-butanediol, 1,4-butanediol, 2,3-butanediol, trans-2-butene-1, 4-diol, cis-2-butene-1,4-diol, 2,4-pentanediol, 1,5-pentanediol, 2,4-hexanediol, 1,5-hexanediol, 1,6-hexanediol, 2,5-hexanediol, 2-methyl-1,3-pentanediol, 2-methyl-2,4-pentanediol, 2,3-dimethyl-2,3-butanediol, 2,4-heptanediol, 3,3-di(hydroxymethyl)pentane, 2-ethyl-1,3-hexanediol, 2-ethyl-1,1-di(hydroxymethyl)pentane, and neopentyl glycol. Also useful for the purposes of this invention are the polyalkylene glycols, including polyethylene glycols, polypropylene glycols, and the polyethylene-polypropylene glycols. Examples of these include diethylene glycol, triethylene glycol, tetraethylene glycol, and dipropylene glycol. The polyalkylene glycols are prepared by polymerization of ethylene oxide and/or propylene oxide, respectively. The preferred molecular weight range for the indicated polyalkylene glycols is from about 106 to about 3000 for the polyethylene glycols, from about 134 to about 2000 for the polypropylene glycols, and up to about 5000 for the polyethylene-polypropylene glycols. Triols useful herein include glycerol, trimethylolethane, trimethylolpropane, and 1,2,6-hexanetriol. Useful higher alcohols include erythritol, pentaerythritol, ribitol, sorbitol, d-mannitol, dipentaerythritol, and copolymers of allyl alcohol and the styrene having molecular weights from about 500 to about 2500. The latter copolymer may contain from 10 to 90 mole percent of allyl alcohol and 90–10 mole percent of a styrene.

The phosphorus acid reactant may be phosphoric acid, phosphorus pentoxide or mixtures of phosphoric acid and phosphorus pentoxide. This includes pyrophosphoric acid, metaphosphoric acid, as well as the various polyphosphoric acids, all of which are readily formed by mixing the proper amounts of water with phosphorus pentoxide. Aqueous solutions of phosphoric acid, such as commercial 85% aqueous phosphorus acid, may be used. Aqueous solutions having lower concentrations of phosphoric acid, such as 75% or lower, may be used, the lower concentration limit being a practical matter relating to reaction mixture compatibility, reactivity, and the end use of the reaction product.

Useful compositions may be prepared from the processes of this invention wherein from about 1 to about 15 moles of the benzene carboxylic reactant, from about 1 to about 15 moles of the polyhydroxy hydrocarbon, and about 1 mole of the phosphorus acid reactant are utilized. Because of greater product versatility, it is preferred to use from about 2 to about 4 moles of the benzene carboxylic reactant, from about 2 to about 10 moles of the polyhydroxy hydrocarbon, and about 1 mole of the phosphorus acid. The preferred range for the polyhydroxy hydrocarbon is further qualified dependent upon how many hydroxyl radicals there are per molecule of the selected reactant. Thus, when a diol, such as neopentyl glycol, is used the preferred molar range is from about 2 to about 10 moles, whereas when a hexitol, such as dipentaerythritol, is used the preferred range is from about 2 to about 4 moles.

Specific examples of the preferred compositions of this invention include reaction products prepared from: 10 moles of trimesic acid, 10 moles of dipropylene glycol, and 1 mole of phosphorus pentoxide; 4 moles of hemimellitic acid, 2 moles of dipentaerythritol, and 1 mole of phosphorus pentoxide; 4 moles of trimesic acid, 2 moles of sorbitol, and 1 mole of phosphorus pentoxide; 4 moles of trimesic acid, 2 moles of a copolymer (molecular weight: 1150) of equimolar portions of allyl alcohol and styrene, and 1 mole of phosphorus pentoxide; 15 moles of trimellitic acid, 10 moles of neopentyl glycol, and 1 mole of phosphorus pentoxide; 2 moles of trimellitic acid, 10 moles of neopentyl glycol, and 2 moles of phosphoric acid; 3 moles of trimellitic anhydride, 10 moles of triethylene glycol, and 1 mole of phosphorus pentoxide; 3 moles of trimellitic anhydride, 6 moles of trimethylolethane, and 1 mole of phosphorus pentoxide; 3 moles of trimellitic anhydride, 8 moles of glycerol, and 1 mole of phosphorus pentoxide; and 3 moles of trimellitic anhydride, 7.5 moles of neopentyl glycol, and 1 mole of phosphorus pentoxide.

The following examples are submitted to illustrate specific modes of preparing the compositions of this invention. They are presented for the purpose of illustration only and are not to be construed as limiting the scope of the present invention, except as the latter is defined by the appended claims. All parts are by weight unless otherwise indicated.

EXAMPLE 1

To 780 grams (7.5 moles) of neopentyl glycol at 130° C. there is added 576 grams (3 moles) of trimellitic anhydride. The reaction mixture is heated at 120°–157° C. for 20 minutes. The reaction mixture is heated at 155°–160° C. and blown with nitrogen gas for 1.25 hours causing 42 milliliters of water to be separated from the reaction mixture. The reaction mixture has an acid number of 141 (phenolphthalein). Phosphorus pentoxide (142 grams or 1 mole) is added to the acidic reaction mixture at 100°–118° C. (exothermic) within 10 minutes. The reaction mixture has a dark brown coloring. The reaction mixture is heated at 145°–160° C. and purged with nitrogen gas for 50 minutes causing 20 milliliters of water to be separated from the reaction mixture. The reaction mixture, a dark amber colored and clear liquid, is mixed with 1438 grams of i-butyl alcohol (solvent), stirred at 90° C. for 1 hour, and filtered. The product has a phosphorus content of 2.1%, an acid number of 32 with bromphenol blue indicator, and an acid number of 102 with phenolphthalein indicator.

EXAMPLE 2

The procedure of Example 1 is repeated except that 630 grams (3 moles) of trimellitic acid is used in lieu of the trimellitic anhydride.

EXAMPLE 3

The procedure of Example 1 is repeated except that 796 grams (7.5 moles) of diethylene glycol is used in lieu of the neopentyl glycol.

EXAMPLE 4

The procedure of Example 1 is repeated except that 990 grams (7.5 moles) of 2,4-heptanediol is used in lieu of the neopentyl glycol.

EXAMPLE 5

The procedure of Example 1 is repeated except that 572 grams (7.5 moles) of propylene glycol is used in lieu of the neopentyl glycol.

EXAMPLE 6

The procedure of Example 1 is repeated except that 781 grams (7.5 moles) of 1,5-pentanediol is used in lieu of the neopentyl glycol.

EXAMPLE 7

The procedure of Example 1 is repeated except that 1010 grams (7.5 moles) of dipropylene glycol is used in lieu of the neopentyl glycol.

EXAMPLE 8

A mixture of methyl isobutyl ketone (1438 grams), neopentyl glycol (780 grams or 7.5 moles), and trimellitic anhydride (576 grams or 3 moles) is heated to 81° C. Phosphorus pentoxide (142 grams or 1 mole) is added to the reaction mixture at 81°–90° C. (exothermic) within 6 minutes. The $P_2O_5$-treated reaction mixture is heated at 123°–125° C. for 8 hours causing 62 milliliters of water to be removed. The reaction mixture is cooled to room temperature. The product has a phosphorus content of 2.1%, an acid number of 54 with bromphenol blue indicator, and an acid number of 118 with phenolphthalein indicator.

EXAMPLE 9

A mixture of methyl isobutyl ketone (1438 grams), neopentyl glycol (780 grams or 7.5 moles), and trimellitic anhydride (576 grams or 3 moles) is heated at 125°–128° C. for 6.33 hours causing 42 milliliters of water to be removed. Phosphorus pentoxide (142 grams or 1 mole) is added to the reaction mixture at 97°–101° C. (exothermic) within 10 minutes. The $P_2O_5$-treated reaction mixture is refluxed for 0.5 hour and heated at 125° C. for 6 hours causing 21 milliliters of water to be removed. The product, a dark amber fluid, is cooled to room temperature. The product has a phosphorus content of 2.1%, an acid number of 51 with bromphenol blue indicator, and an acid number of 121 with phenolphthalein indicator.

EXAMPLE 10

The procedure of Example 9 is repeated except that 3190 grams (7.5 moles) of a commercial polypropylene glycol having a molecular weight of 425 is used in lieu of the neopentyl glycol.

EXAMPLE 11

The procedure of Example 9 is repeated except that 2250 grams (7.5 moles) of a commercial polyethylene glycol having a molecular weight of 300 is used in lieu of the neopentyl glycol.

EXAMPLE 12

Trimellitic anhydride (2160 grams or 11.3 moles) is added to neopentyl glycol (2925 grams or 28.1 moles) at 130°–120° C. The reaction mixture is heated at 140°–147° C. for 0.5 hour and then heated at 155°–160° C. and blown with nitrogen gas for 1 hour causing 158 milliliters of water to be removed. The reaction product has an acid number of 156 (phenolphthalein). Phosphorus pentoxide (532.5 grams or 3.75 moles) is added to the reaction mixture at 100°–130° C. (exothermic) in 5 minutes. The temperature rises (exothermic) to 136° C. in 5 minutes. The $P_2O_5$-treated reaction mixture is heated at 136°–163° C. and blown with nitrogen gas for 50 minutes causing 82 milliliters of $H_2O$ to be removed. The reaction product is mixed with 3585 grams of butyl cellosolve, stirred for 1 hour at 90° C., mixed with a filtering aid, and filtered. The product, an amber liquid, has a phosphorus content of 2.5%, an acid number of 72 with bromphenol blue indicator, and an acid number of 119 with phenolphthalein indicator.

EXAMPLE 13

Trimellitic anhydride (384 grams or 2 moles) is added to neopentyl glycol (520 grams or 5 moles) at 125°–115° C. The reaction mixture is heated at 142°–158° C. and blown with nitrogen gas for 1 hour causing 28 milliliters of water to be removed. Phosphorus pentoxide (94 grams or .67 mole) is added to the reaction mixture at 99°–132° C. within 5 minutes. The $P_2O_5$-treated material is heated at 150° C. and blown with nitrogen gas for 55 minutes causing 6 milliliters of water to be removed. A 28% aqueous solution of ammonia hydroxide (220 grams) is added to the reaction mixture at 100°–75° C. underneath the surface with mixing. Water (1690 grams) and more ammonium hydroxide solution (23 grams) are added to the reaction product mixture underneath the surface. The batch is heated at 90° C. for 0.75 hour, heated at 90° C. and blown with ammonia (2 cubic feet/hour) for 1 hour, cooled to 25° C. in 2 hours, and filtered. The product has a phosphorus content of 1.4%, a nitrogen content of 2.2%, a base number of 52 using bromphenol blue, and an acid number of 69 using phenolphthalein indicator.

EXAMPLE 14

Trimellitic anhydride (576 grams or 3 moles) is added to neopentyl glycol (780 grams or 7.5 moles) at 130°–112° C. The mixture is heated at 130° C. for 45 minutes. Phosphorus pentoxide (142 grams or 1 mole) is added to the mixture at 132°–160° C. (exothermic) in 0.25 hour. The reaction mixture is heated at 156°–164° C. and blown with nitrogen gas for 1.33 hours causing 62 milliliters of water to be removed. Methyl isobutyl ketone (719 grams) is added to the reaction mixture and the whole is stirred for 1 hour at 95° C. Additional methyl isobutyl ketone (719 grams) is added to the reaction mixture at room temperature and the whole is filtered. The product has a phosphorus content of 1.9%, an acid number of 45 with bromphenol blue indicator, and an acid number of 85 using phenolphthalein indicator. The product has a dark amber color.

EXAMPLE 15

To a mixture of xylene (950 grams) and neopentyl glycol (520 grams or 5 moles) at 130° C. there is added 384 grams (2 moles) of trimellitic anhydride. The reaction mixture is heated at 130°–140° C. for 0.5 hour causing 1 milliliter of water to be removed. The reaction mixture is heated at 133°–140° C. for 2.5 hours causing 29 milliliters of water to be removed. Phosphorus pentoxide (85 grams or 0.6 mole) is added to the reaction mixture at 78°–95° C. (exothermic) within 3 minutes. The reaction mixture is heated at 142° C. for 0.5 hour causing removal of 14 milliliters of water and is then refluxed for one hour at 140° C. Ammonia (78 grams or 4.6 moles) dissolved in water (1521 grams) is added to the reaction mixture at 63° C. The mixture at 70° C. is stirred and purged with nitrogen gas at a rate of 4 cu. ft./hr. for one hour. The reaction mixture is allowed to separate into two layers. Using a separatory funnel, the product layer is separated from the upper xylene layer. The recovered water or product layer is heated at 69° C./80 mm. for 1.5 hours causing removal of xylene and water, the water being returned to the product mixture. The product, 2487 grams of a clear yellow liquid, has a phosphorus content of 1.45%, a base number of 39 with bromphenol blue indicator, and an acid number of 79 with phenolphthalein indicator.

EXAMPLE 16

To 260 grams (2.5 moles) of neopentyl glycol at 135° C. there is added 192 grams (1 mole) of trimellitic anhydride. The reaction mixture is held at 120°–144° C. until clear. The reaction mixture is heated at 144° C. for 1.5 hours causing 14 milliliters of water to be separated from the reaction mixture. To the reaction mixture at 140°–90° C. there is added 57.5 grams (0.5 mole) of commercial 85% aqueous phosphoric acid over a period of 15 minutes. The phosphoric acid-containing mixture is heated at 134°–147° C. for 1 hour causing 25 milliliters of water to be separated from the reaction mixture. The resulting composition is the product.

EXAMPLE 17

To 855 grams (8.22 moles) of neopentyl glycol at 145° C. there is added 363 grams (1.89 moles) of trimellitic anhydride. The mixture is heated at 135°–160° C. for 30 minutes. Nitrogen gas is bubbled through the mixture at 155°–160° C. for 1.5 hours causing 24 milliliters of water to be separated from the reaction mixture. To the reaction mixture at 90° C. there is added 142 grams (1 mole) of phosphorus pentoxide in 7 minutes and the temperature of the reaction mixture rises to 123° C. Nitrogen gas is bubbled through the reaction mixture as it is heated to 158° C. in 1 hour, causing 16.5 milliliters of water to be separated from the reaction mixture. To the reaction mixture at 90° C. there is added 880 grams of butyl Cellosolve and the resulting mixture is stirred at 55° C. for 1 hour. The product, an amber fluid, has a phosphorus content of 2.78%, an acid number of 51 with bromphenol blue indicator, and an acid number of 99 with phenolphthalein indicator.

EXAMPLE 18

To 562 grams (5.4 moles) of neopentyl glycol at 145° C. there is added 273 grams (1.42 moles) of trimellitic anhydride. The mixture is held at 135°–145° C. for 0.5 hour. Nitrogen is bubbled through the mixture at 145°–161° C. for 1.33 hours causing 20 milliliters of water to be separated from the reaction mixture. To the reaction mixture at 94° C. there is added 213 grams (1.5 moles) of $P_2O_5$ and the temperature rises to 176° C. Nitrogen is bubbled through the reaction mixture at 145–170° C. for 0.75 hour causing 11 milliliters of water to be separated from the reaction mixture. To the reaction mixture at 100° C. there is added 675 grams of butyl Cellosolve. The resulting mixture is stirred at 60°–70° C. for 1.5 hours. The product, a slightly viscous amber liquid, has a phosphorus content of 5.43%, an acid number of 125 with bromphenol blue indicator, and an acid number of 175 with phenolphthalein indicator.

EXAMPLE 19

A mixture of methyl isobutyl ketone (456 grams), 1,5-pentanediol (104 grams or 1 mole), 1,2,6-hexanetriol (134 grams or 1 mole), and trimellitic anhydride (192 grams or 1 mole) is heated to 80° C. Phosphorus pentoxide (47 grams or ⅓ mole) is added to the reaction mixture at 80°–87° C. (exothermic) within 7.5 minutes. The reaction mixture is heated at 118°–121° C. for 4.25 hours causing 21 milliliters of water to be removed from the reaction. The reaction mixture is cooled to room temperature. The product has a phosphorus content of 2%, an acid number of 69 using bromphenol blue indicator, and an acid number of 161 using phenolphthalein indicator.

EXAMPLE 20

A mixture of methyl isobutyl ketone (481 grams), neopentyl glycol (208 grams or 2 moles), catechol (55 grams or 0.5 mole), and trimellitic anhydride (192 grams or 1 mole) is heated at 77° C. Phosphorus pentoxide (47 grams or ⅓ mole) is added to the reaction mixture at 77°–91° C. (exothermic). The reaction mixture is heated at 127° C. for 7.75 hours causing removal of 20 milliliters of water from the reaction mixture. The reaction mixture is cooled. The product has a phosphorus content of 2.1%, an acid number of 66 using bromphenol blue indicator, and an acid number of 135 using phenolphalein indicator.

EXAMPLE 21

A mixture of methyl isobutyl ketone (645 grams), trimethylolpropane (54 grams or 0.4 mole), a copolymer molecular weight: 1150) of equimolar portions of allyl alcohol and styrene (460 grams or 4.0 mole), and trimellitic anhydride (115 grams or 0.6 mole) is heated to 85° C. Phosphorus pentoxide (28 grams or 0.2 mole) is added to the reaction mixture at 85°–96° C. (exothermic) within 5 minutes. The reaction mixture is heated at 116°–120° C. for 7.17 hours causing removal of 13 milliliters of water. The reaction mixture is cooled. The product has a phosphorus content of 1%, an acid number of 46 using bromphenol blue indicator, and an acid number of 81 using phenolphthalein indicator.

EXAMPLE 22

A mixture of methyl isobutyl ketone (528 grams), dipropylene glycol (268 grams or 2 moles), dipentaerythritol (42 grams or 0.17 mole), and trimellitic anhydride (192 grams or 1 mole) is heated to 120° C. The reaction mixture is cooled to 64° C. and then phosphorus pentoxide (47 grams or ⅓ mole) is added thereto within 10 minutes. The reaction mixture is heated at 123° C. for 7 hours causing 9.2 milliliters of water to be removed. The reaction mixture is cooled to room temperature. The product has a phosphorus content of 1.9%, an acid number of 65 using bromphenol blue indicator, and an acid number of 157 using phenolphthalein indicator.

EXAMPLE 23

To 3900 grams (37.5 moles) of neopentyl glycol at 130° C. there is added to 880 grams (15 moles) of trimellitic anhydride. The temperature of the mixture drops initially to 115° C. and then rises to 153° C. over a period of 0.5 hour. Nitrogen gas is bubbled through the mixture at 153°–165° C. causing 216 milliliters of water to be separated from the reaction mixture. To the mixture at 91° C. there is added 710 grams (5 moles) of phosphorus pentoxide over a period of 0.25 hour and the temperature of the reaction mixture rises to 140° C. Nitrogen gas is bubbled through the reaction mixture at 140°–164° C. for 0.67 hour causing 107 milliliters of water to be separated from the reaction mixture. The product thus formed, a composition of this invention, is cooled to 120° C. and analysis thereof indicate a phosphorus content of 4.29%, an acid number of 105 with bromphenol blue indicator, and an acid number of 170 with phenolphthalein indicator. To a half-gallon jar there is added 717 grams of the composition prepared above (at 120° C.), 73 grams of n-butylamine, and 644 grams of distilled water. The jar is sealed and rolled (120 r.p.m.) on a roller mill for 14 days, increments of 90 grams and 180 grams of butyl Cellosolve being added thereto after 4 and 6 days, respectively. Tertiary butylamine (13 grams) is added and rolling is continued for 24 hours. The contents of the jar are stirred at 90°–95° C. until a solution is obtained. The solution has a phosphorus content of 1.2%, a nitrogen content of 1.9%, a base number of 52 with bromphenol blue, an acid number of 69 with phenolphthalein, and a pH of 8.7.

EXAMPLE 24

A composition of this invention prepared as in Example 23 (717 grams at 120° C.), 149 grams of triethanolamine, and 568 grams of distilled water are placed in a half-gallon jar which is sealed and then rolled (120 r.p.m.) on a roller mill for 9 days. A clear yellow solution is obtained having a phosphorus content of 1.6, a nitrogen content of 1.3, a base number of 64 with bromphenol blue indicator, an acid number of 66 with phenolphthalein indicator, and a pH of 6.6.

EXAMPLE 25

A composition of this invention prepared as in Example 23 (717) grams at 120° C.), 87 grams of morpholine, and 630 grams of distilled water are placed in a half-gallon jar which is sealed and then rolled (120 r.p.m.) on a roller mill for 10 days, increments of 90, 180, and 180 grams of butyl Cellosolve being added thereto after 4, 6, and 9 days, respectively. The mixture is stirred at 90°–95° C. until a solution is obtained. The solution has a phosphorus content of 1.6, a nitrogen content of 1.8, a base number of 57 with bromphenol blue indicator, an acid number of 66 with phenolphthalein indicator, and a pH of 7.9.

The compositions of this invention are useful on virtually all known metal surfaces. They are most useful on the surfaces of ferrous metal, galvanized metal, aluminum, and zinc. Phosphated metal surfaces, especially phosphated ferrous metal surfaces are improved markedly with respect to their rust-protective and paint-retentive properties, by the subsequent application of protective films prepared from compositions of this invention. Such phosphated ferrous metal surfaces which have been phosphated by a calcium-containing, zinc phosphating bath, as described in U.S. Patent 3,090,709 are especially suitable.

The phosphorus-containing compositions of this invention can be employed as the only film-forming component of the coating composition. That is, the phosphorus-containing compositions per se, such as illustrated in Examples 1–24 above, form very effective protective films on metal surfaces. Even thin films, e.g., 25–250 mg./ft.$^2$ are useful. Ordinarily, these phosphorus-containing compositions are diluted with volatile, inert, organic solvents to facilitate application of the coating to the metal surface. Suitable illustrative solvents are set forth below. The term "volatile" as used in the present specification is intended to encompass those organic solvents which evaporate readily upon standing at room temperature or upon the application of heat up to a temperature below the decomposition temperature for a given phosphorus-containing composition. The temperatures utilized in drying will normally not exceed about 400° C.

Another important characteristic of the protective films wherein the phosphorus-containing composition per se is the major component is their receptiveness to subsequent top-coats of other known types of siccative organic coatings conventionally applied to metal surfaces. Such a combination coating is remarkably effective in protecting the metal substrate.

Another important characteristic of the phosphorus-containing composition per se is their compatibility with other conventional types of siccative organic coatings used to protect metal surfaces. Because of this compatibility, a diverse group of effective metal coating compositions comprising mixtures of both types of coatings is possible, for example, from about 0.01% to about 99% by weight of a phosphorus-containing composition with the remainder of the composition being one or more conventional siccative organic coating compositions. The percent by weight referred to is intended to exclude volatile components in the compositions which are to be removed during film-formation. These combinations of phosphorus-containing compositions and siccative organic coating compositions result in a variety of coatings which can be applied to various metal surfaces to obviate many metal corrosion problems.

Siccative organic coatings for metals are well known in the art and include paints, lacquers, enamels, varnishes, primers, and synthetic resins coating compositions. Representative examples of some of these materials suitable for coating metal are found in Elias Singer, Fundamentals of Paint, Varnish, and Lacquer Technology published by the American Paint Journal Company, St. Louis, 1957. Still other siccative organic coatings for metals are disclosed in "Modern Plastics," vol. 38, No. 1A, September 1960. These references are incorporated herein by reference since there is no need to lengthen this specification to describe an admittedly old component of the present compositions.

The siccative organic coating compositions contemplated for use in combination with the phosphorus-containing compositions of the invention can comprise volatile or non-volatile vehicles as solvents or dispersants for the other components therein. Thus, they can include paints and varnishes containing drying oils such as linseed oil, tung oil or China-wood oil, oiticica oil, dehydrated castor oil, fish oil, soya bean oil, safflower oil, hempseed oil, sunflower seed oil, and the like. Suitable resinous components for use in these siccative coatings include phenolic resins, polyester resins including alkyd resins, vinyl resins such as polyvinylchloride and polyvinylacetate, urea-formaldehyde resins, melamine-formaldehyde resins, and the like. In addition, the siccative organic coatings can contain metal driers for drying and semi-drying oils such as cobalt, lead, manganese, iron, calcium, and zinc in the form of salts with carboxylic acids which are soluble in said oils such as the metal linoleates, oleates, octanoates, and naphthenates. Moreover, the siccative organic coatings can contain various pigments, plasticizers, stabilizers, etc., normally found in siccative organic coatings.

These siccative organic coatings are subject to drying by various well known mechanisms. Thus, volatile solvents or dispersants evaporate leaving deposited the organic material which forms the protective coating. The coating may contain a drying oil or semi-drying oil which oxidizes to form a tough dry coating. Drying of such oils is facilitated by incorporation of metal driers into the coating compositions. In addition, the coating may dry by a chemical reaction among the various components thereof. Thus, epoxy films can be formed on metals by the heat induced reaction of an epoxy material and a cross-linking agent, e.g., epoxy-phenolic or epoxy-urea film-forming composition. The mechanism by which the siccative coatings "dry" is not critical to the invention.

The compositions of this invention and the coating compositions containing same may be applied to metal articles by any one of the methods ordinarily used in the paint and varnish industry including brushing, spraying, dip-coating, flow-coating, roller-coating, and the like. The viscosity of the coating compositions may be adjusted for the particular method of application selected by adding a suitable amount of one or more volatile, inert organic solvents such as benzene, xylene, mesitylene, aromatic petroleum spirits, turpentine, or other appropriate solvents. The compositions of this invention may be likewise diluted with the solvents indicated as useful reaction media. When it is desired to coat phosphated steel with a composition of this invention it is often desirable to apply such compositions from water-base solutions in the rinsing zone of a phosphating production line. The metal surface which has been thus coated is then cured or dried either by exposure to air or by means of a baking procedure. A dry film thickness of a composition of this invention or of a coating composition containing the same ranging from about 0.01 mil to about 4 mils, preferably 0.02–2 mils, is usually required to provide adequate protection for the metal article. Coatings heavier than 4 mils can be used, if desired, but they normally contribute little in the way of additional protection. When the compositions of this invention are to be used as paint bases or primers, a dry film thickness of at least about 25 mg./ft.$^2$ is effective. A dry film thickness of 50–300 mg./ft.$^2$ is preferred.

In drying the films prepared from the compositions of this invention, as indicated, a baking procedure may be used or the films may be dried by exposure to air. The baking temperature may be from about 100° C. to about 400° C. This baking temperature range is, however, merely illustrative. That is, the baking step serves to remove any solvent in the film and to react the components in the film with each other and with the metal surface. Thus, where a baking step is used, the temperature will vary depending upon the extent to which the reactants of compositions of this invention have been reacted prior to application as coatings and the time requirements inherent in particular manufacturing schedules for production of coated metal articles.

To enhance the properties of the compositions of this invention in the aforesaid functions, it is often desirable to admix therewith small portions, viz., 1–5% by weight or more, of chromic acid, zinc nitrate, amine chromates, amine molybdates, and metal dichromates such as zinc and calcium dichromates. In many instances, addition of one or more of the indicated improving agents will enhance the corrosion resisting properties of the compositions of this invention. In some instances, it is desirable to admix the compositions of this invention with conventional pigments, e.g., titanium dioxide and chrome green and conventional improving agents such as pigment extenders, antiskinning agents, driers, gloss agents, and color stabilizers.

As indicated, the compositions of this invention are useful as additives for siccative organic coatings. They may also be blended or modified with siccative organic coating compositions. Coating compositions within the scope of this invention include those comprising a siccative organic coating composition and from about 0.01% by weight to about 99% by weight on a non-volatile materials basis of a composition of this invention. As additives, concentrations of 0.01–10% of the compositions of this invention in siccative organic coating compositions impart anti-corrosion and other desirable properties to films prepared therefrom without seriously affecting other useful properties of such coating compositions. In some instances, addition of small amount, e.g., 1–10%, of siccative organic coating compositions to the compositions of this invention allow for improved film performance without seriously altering the properties of the compositions of this invention. The combination of a siccative organic coating composition and from about 10% to about 90% of a composition of this invention provides films which are often effective in solving specific coating problems. For example, the coating composition described later in Formulation K (applied to metal by dip-coating and baking at 316° C. for 2 minutes) is exceptionally useful when applied to galvanized steel surfaces as a primer for organosol (dispersions of vinyl resins in plasticizers and volatile solvents) and plastisol (dispersions of vinyl resins and plasticizers) topcoats, e.g., a composition comprising 100 parts of polyvinyl chloride resin, 80 parts of dioctyl phthalate, and 1 part of dibutyl tin maleate.

To prepare the final coating compositions, the compositions of this invention may simply be admixed with the appropriate solvent or solvents at the appropriate concentrations for any given coating procedure. Ordinarily, a concentrate of a composition of this invention is prepared by dissolving it in a limited amount of solvent, optionally with other siccative organic coating compositions and improving agents, and the concentrate is then diluted with additional solvent to prepare the final coating compositions. In preparing aqueous coating compositions or concentrates, it is often necessary to treat the compositions of this invention with solubilizing agents, i.e., materials that will improve the water-solubility of the compositions of this invention, either before addition to water or in an aqueous medium. Materials useful as solubilizing agents for the compositions of this invention include alkaline earth metal bases (e.g., calcium hydroxide, barium hydroxide, etc.) basic nitrogen-containing compounds, and water miscible solvents (e.g., butyl Cellosolve, i-butanol, dioxane, and ethyl Cellosolve). Basic nitrogen-containing compounds useful for this purpose include ammonia; ammonium hydroxide; mono-, di-, and tri-lower alkyl amines such as butylamine, propylamine, dimethylamine, diethylamine, diisopropylamine, triethylamine; and lower alkylene polyamines such as ethylenediamine, 1,3-butylenediamine, methylenediamine, and diethylene triamine; heterocyclic amines such as pyrrolidine, piperazine, piperidine, and morpholine; and hydroxy-lower alkyl substitued amines such as 2-amino-2-methyl-1-propanol, triethanolamine, and dimethylaminoethanol. The amount of basic nitrogen-containing compound necessary for the purpose of solubilizing the compositions of this invention in water will vary depending upon the acid number of the compositions of this invention. The relative amounts of the composition of this invention and the basic nitrogen-containing compound are usually such to allow the final combination to have a pH of from about 6 to about 9 in water at a temperature of 25° C. Usually, this means combining from about 5 to about 25 parts by weight of a basic nitrogen-containing compound with 100 parts by weight of a composition of this invention. The temperatures at which the compositions of this invention are solubilized in water is not critical and usually ranges from about room temperature to about 100° C.

To illustrate the invention more specifically, examples of formulations containing the compositions of this invention are set forth. Unless otherwise indicated, all parts are by weight.

Formulation A

| | Percent |
|---|---|
| Product of Example 1 | 45.0 |
| Butyl Cellosolve | 27.5 |
| A commercial aromatic petroleum solvent composed primarily of toluene substituted with lower alkyl radicals, having a boiling temperature range of 161°–177° C., and having a kauri-butanol value of 93.3 | 27.5 |

Formulation B

| | |
|---|---|
| Product of Example 15 | 56.6 |
| Water | 43.4 |

Formulation C

| | |
|---|---|
| Product of Example 12 | 35.8 |
| Butyl Cellosolve | 32.1 |
| The commercial aromatic petroleum solvent described in Formulation A | 32.1 |

Formulation D

| | |
|---|---|
| Product of Example 12 | 21.5 |
| A commercial urea-formaldehyde condensation resin terminated by ether linkages derived from butyl alcohol and having an acid number of 3–6 | 8.6 |
| Xylene | 2.3 |
| Butanol | 3.4 |
| Butyl Cellosolve | 32.1 |
| The commercial aromatic petroleum solvent described in Formulation A | 32.1 |

Formulation E

| | |
|---|---|
| Product of Example 12 | 19.3 |
| A commercial thermoplastic vinyl interpolymer of 90% vinyl chloride, 4.3% vinyl acetate, and 5.7% vinyl alcohol | 7.8 |
| Methyl isobutyl ketone | 65.6 |
| The commercial aromatic petroleum solvent described in Formulation A | 7.3 |

Formulation F

| | |
|---|---|
| Product of Example 12 | 17.4 |
| The commercial urea-formaldehyde condensation resin of Formulation D | 3.5 |
| The commercial vinyl interpolymer of Formulation E | 4.4 |
| Xylene | 0.9 |
| Butanol | 1.4 |
| Methyl isobutyl ketone | 60.5 |
| The commercial aromatic petroleum solvent described in Formulation A | 11.9 |

Formulation G

| | Percent |
|---|---|
| Product of Example 12 | 27.2 |
| The commercial urea-formaldehyde condensation resin of Formulation D | 3.1 |
| The commercial vinyl interpolymer of Formulation E | 3.1 |
| Tri-cresyl phosphate | 2.5 |
| Xylene | 0.8 |
| Butanol | 1.3 |
| Methyl isobutyl ketone | 50.5 |
| Butyl Cellosolve | 0.9 |
| The commercial aromatic petroleum solvent described in Formulation A | 10.6 |

Formulation H

| | |
|---|---|
| Titanium dioxide | 22.2 |
| A commercial non-oxidizing alkyl resin | 24.6 |
| A commercial urea-formaldehyde condensation resin terminated with ether linkages derived from butanol and having an acid number of 14–18 | 3.7 |
| The product of Example 12 | 29.3 |
| Toluene | 3.2 |
| Butanol | 2.2 |
| The commercial aromatic petroleum solvent described in Formulation A | 4.8 |
| A commercial aromatic petroleum solvent having a boiling temperature range of 224°–270° C. and a kauri-butanol value of 98.0 | 5.2 |
| A commercial aromatic petroleum solvent having a boiling temperature range of 180°–204° C. and a kauri-butanol value of 72.0 | 2.6 |
| A commercial lanthium and cerium naphthenate drier | 0.27 |
| A polydimethyl siloxane anti-silking and anti-flooding agent having viscosity of about 20 cs. at 25° C. | 0.31 |
| A commercial amine-type anti-settling agent | 0.41 |

Formulation I

| | |
|---|---|
| Titanium dioxide | 21.3 |
| A commercial water-soluble melamine-acrylic resin | 24.2 |
| Product of Example 12 | 3.1 |
| Water | 51.4 |

Formulation J

| | |
|---|---|
| Product of Example 12 | 13.5 |
| The vinyl interpolymer described in Formulation E | 5.4 |
| Butyl Cellosolve | 14.9 |
| 4-methoxy-4-methyl pentanone-2 | 66.2 |

Formulation K

| | |
|---|---|
| Product of Example 12 | 26.7 |
| A commercial vinyl interpolymer of 86% vinyl chloride, 13% of vinyl acetate, and 1% of maleic anhydride | 1.8 |
| A commercial acrylic resin prepared by copolymerization of esters of acrylic acid and methacrylic acid | 1.8 |
| Dioctyl phthalate | 2.7 |
| Butyl Cellosolve | 33.3 |
| The commercial aromatic petroleum solvent described in Formulation A | 33.3 |

The utility of the compositions of this invention is more specifically illustrated by the examples set forth below.

EXAMPLE I

Two 4-inch x 12-inch panels of galvanized 20-gauge SAE 1020 cold-rolled steel are dip-coated, respectively, with two different compositions of this invention. A third and similar panel receives no dip-coating treatment. The dip-coated panels are baked in an oven at 232° C. for 5 minutes.

Thereafter, each panel is spray-coated with a commercial, pigmented, white, thermoplastic, vinyl paint and baked in an oven at 163° C. for 17 minutes. The dry film thickness of the vinyl paint on these panels is approximately 1 mil. The bottom portions of the indicated panels are diagonally scribed through the paint and into the metal with a sharp instrument forming an X pattern thereon. The painted panels are then subjected to the Salt Fog Corrosion test described in ASTM procedure B117–57T. In this test the panels, inclined 15° from the vertical with the scribed side up, are maintained in contact with a mist or fog of 5% aqueous sodium chloride for a pre-determined time (in this case, 1000 hours) at 95°±2° F. The panels are removed from the Salt Fog chamber, washed with tap water to remove any salt deposit, and adhesive cellophane tape is applied along the scribe lines and over the entire area of the upper portion of the panel. The tape is abruptly removed from the panels which are inspected to determine the percent paint still adhering to the galvanized metal substrate on the upper portion and the loss of adhesion caused by corrosion from the scribed lines measured in thirty-seconds of an inch, called "creep." The results of the inspection are given in Table I.

TABLE I

| Paint base | | Percent adhesion | Creep |
|---|---|---|---|
| Dip-coating composition | Film wt. (mg./ft.²) | | |
| Blank | | 90 | >10 |
| Formulation A | 162 | 99 | 0.5 |
| Formulation B | 156 | 93 | 2 |

EXAMPLE II

The procedure of Example I is repeated except that the panels are top-coated (spray-painted) with a commercial, white, thermosetting, polyester paint and baked at 191° C. for 10 minutes. The dried film thickness of the polyester paint is about 1 mil. Results of the test inspection appear in Table II.

TABLE II

| Paint base | | Adhesion | Creep |
|---|---|---|---|
| Dip-coating composition | Film wt. (mg./ft.²) | | |
| Blank | | 30 | >10 |
| Formulation A | 162 | 95 | 1 |

EXAMPLE III

Four 4-inch x 12-inch panels of galvanized 20-gauge SAE 1020 cold-rolled steel are dip-coated in compositions of this invention and dried as indicated in Table III. A similar panel received no dip-coating treatment (for purposes of control).

Thereafter, each panel is spray-painted with the commercial vinyl paint described in Example I and baked for 17 minutes at 163° C. The dry film thickness of the paint is about 1 mil.

The above procedure is repeated except that the panels are spray-painted with the commercial polyester paint described in Example II and baked at 191° C. for 10 minutes. The dry film thickness of the paint is about 1 mil.

From all of the panels prepared as indicated above, two duplicate sets of panels are extracted. One set of exposed to weathering in the Miami, Fla. area, about 8 miles from the eastern coast for six months. The other set is exposed to weathering in the Houston, Tex. industrial area for six months.

The exposed panels are cut to size for the Butler Abrasion test. According to the test, 1.5-inch x 3-inch panels are subjected to the abrasive action of porcelain cylinders (13/16-inch x 13/16-inch), sand, and water for 45 minutes in a rolling (36 r.p.m.) cylindrical jar. At the end of this time the panels are washed, dried and then a piece of cellophane adhesive tape is applied to the surface of each panel and suddenly removed. Any paint which has been loosened by the abrasive action is removed with the tape and the panel is rated in terms of the percent of paint which adheres. The results of this rating appear in Table III.

TABLE III

| Paint base | | Abrasion resistance (percent adhesion) | | | |
|---|---|---|---|---|---|
| Dip-coating composition | Film wt. (mg./ft.²) | Florida V¹ | Exposure p² | Texas V¹ | Exposure p² |
| Blank | | 5 | 25 | 5 | 94 |
| Formulation C³ | 163 | 100 | 96 | 99 | 96 |
| Formulation C⁴ | 156 | 100 | 100 | 100 | 100 |

¹ The vinyl top-coat described in Example I.
² The polyester top-coat described in Example II.
³ The paint base is air dried at room temperature.
⁴ The paint base is dried in an oven for 5 minutes at 450° F.

EXAMPLE IV

Panels are prepared as indicated in Example I except that the bake following dip-coating of compositions of the invention and prior art compositions is for 1 minute at 149° C. and the bake following the vinyl top-coat application is for 75 seconds at 232° C. The dry film thickness of the vinyl top-coat is about 0.9 mil.

The panels are subjected to the Olsen Cup test. In this test, which measures the adhesion of a coating composition to a metal surface under severe deformation conditions, a device is employed in which the coated test panel is securely clamped and then deformed. Access is provided to the panel through a one-inch diameter circular opening. Through this opening a 7/8-inch diameter rounded cylindrical piston is forced against the panel until the resulting dimple ruptures. The panel is then removed and cellophane adhesive tape is applied to the convex surface of the dimple. After removal of the tape, the convex surface of the dimple is rated in a scale of 0 to 100, 100 indicating perfect adhesion and 0 indicating a complete loss of coating composition (i.e., no adhesion). The results of this test are indicated in Table IV.

TABLE IV

| Paint base | | Percent adhesion¹ |
|---|---|---|
| Dip-coating composition | Film wt. (mg./ft.²) | |
| Formulation J | 185 | 98.3 |
| Vinyl Interpolymer² | 174 | 95.0 |
| Formulation C | 175 | 43.3 |

¹ Average value for 6 test runs on the same test panel, 3 on each side.
² The vinyl interpolymer described in Formulation E diluted 9 parts in 91 parts of 4-methoxy-4-methyl pentanone-2.

The results of this test indicate that the combination of a composition of this invention and a vinyl resin is surprisingly effective as a primer or paint base.

EXAMPLE V

A four-inch x eight-inch 20-gauge aluminum panel is spray-painted with the coating composition of Formulation H and then baked for 10 minutes at 149° C. A similar panel is spray-painted with a composition similar to that described in Formulation H except that it contains no product of Example 12 and it is also baked for 10 minutes at 149° C. The dry film thickness of these coatings is about 1 mil.

The indicated panels are subjected to the Conical Mandrel test at 60° F. In this test the painted panel is mounted in the conical mandrel apparatus (described in ASTM D-522-41) so that the form imposed on it through bending will assume the conical shape of the mandrel extending from its smallest dimension (radius) to its dimension 4 inches away from the smallest dimension. The test panel is bent along its four-inch dimension. The panel is then removed from the apparatus and cellophane adhesive tape is applied to the painted surface on the outer portion of the conical section of the panel. The tape is removed suddenly and any paint which has become loosened as a result of the bending step is removed at the same time. The panels are rated in terms of percent adhesion on the outer conical section from which the tape has been removed. A completely intact and uniform paint film over this area merits a rating of 100%. In this test the panel coated with the composition of Formulation H merited a rating of 88%, whereas the paint was completely peeled from the conical section of the other panel, which was assigned a 0% rating.

The indicated panels are also subjected to the Cross-Hatch Adhesion test. In this test, a coated test panel is scratched by a set of 11 razor blades, one-sixteenth of an inch apart, mounted in a holder. A second scratch at right angles to the first is made so that the paint film is thus scored to form 100 small squares. A piece of cellophane adhesive tape is then pressed onto the cross-hatch area and removed suddenly. The tape application and removal is repeated until no more paint can be removed. The cross-hatch section is then rated on a scale from 0 to 10, 10 indicating complete retention of paint on the cross-hatch area. In this test, the panel coated with the coating composition of Formulation H merited a 10 rating whereas the paint was completely removed from the cross-hatch section of the other panel, which was assigned a rating of 0.

These tests illustrate the effectiveness of the compositions of this invention as additives for paint.

EXAMPLE VI

Two 4-inch x 8-inch 20-gauge SAE 1020 steel panels are cleaned with an aqueous alkali solution. One panel is dip-coated with the coating composition of Formulation I. The other panel is dip-coated in a coating composition similar to that of Formulation I except that the 3.1 parts of the product of Example 12 is replaced with 1.9 parts of the water-soluble melamine-acrylic resin described in Formulation I. These panels are baked for 30 minutes at 149° C. The dry film thickness of these panels is about 1.3 mils and about 1.2 mils, respectively.

The indicated panels are subjected to a Salt Fog Corrosion test. The paint film on the panel is ruptured by scoring a 6-inch line on the surface of each panel. The scored panels are mounted 15° from the vertical, scribed side up, in a Salt Fog apparatus (see ASTM Procedure B117–57T) and contacted with a mist or fog of 5% aqueous sodium chloride for a predetermined time (in this case 24 hours) at 95°±2° F. The panels are removed from the Salt Fog apparatus, washed with tap water to remove any salt deposits, and scraped vigorously with a putty knife to dislodge any loosened paint. The panels are inspected to determine the percent of paint still adhering to the steel substrate. In this test, the panel coated with the composition of Formulation H merited a 91% rating whereas the other panel was assigned a 58% rating.

This test is another illustration of the effectiveness of the compositions of this invention as additives for paint.

EXAMPLE VII

A clean 4-inch x 8-inch 20-gauge (American Standard) aluminum panel is dip-coated in the coating solution described in Formulation C and then baked for 5 minutes at 232° C. The dry film weight of this panel is noted to be about 170 mg./ft.$^2$. This panel and a similar panel without any coating are half immersed in water in an autoclave. The panels so arranged are subjected to 15 p.s.i.g. of steam pressure at 250° F. for 70 minutes. The panels are then inspected for corrosion and/or blushing. The panel coated with the coating composition described in Formulation C was perfect, exhibiting high gloss and no white spots whatsoever. The uncoated panel was uniformly coated with a white adherent film on the portion of the panel which was below the water surface and uniformly spotted (0.1–0.4 mm. diameter spots) on the upper portion with a similar white adherent film. The former panel was assigned a pass rating whereas the latter panel failed the test. The test was repeated with a panel having a coating with a film weight of 33 mg./ft.$^2$ (prepared from a diluted solution of Formulation C) thereon of a composition of this invention. This panel also passed the test, exhibiting high gloss and no white spots on the surface.

Similarly, films of the compositions of this invention prevent "white corrosion" on galvanized steel surfaces whereon they are applied. The term "white corrosion" refers to the sacrificial corrosion of the zinc surface on galvanized steel. This type of corrosion is most often observed on the surface of galvanized steel which has been stored in a moist or humid atmosphere, e.g., in warehouses or railroad boxcars. Aside from preventing such corrosion on galvanized surfaces over long periods of storage and/or shipping, films prepared from compositions of this invention also remain exceptionally receptive to subsequent top-coats of siccative organic coatings.

EXAMPLE VIII

The ability of the compositions of this invention to resist white corrosion is demonstrated by the "stack test." In this test three 4-inch x 6-inch panels of galvanized 20-gauge SAE 1020 cold-rolled steel coated with 150 mg./ft.$^2$ of a composition of this invention (diluted Formulation C applied by roller coating and baked 5 minutes at 300° F.) are compared with three similar panels having no coatings. The panels are stacked as follows:

(1) A piece of 4-inch x 6-inch filter paper is positioned on a flat surface and saturated with 3 milliliters of distilled water.
(2) One of the test panels is placed on top of the saturated filter paper.
(3) Another piece of filter paper is placed on top of the test panel and saturated with 3 milliliters of distilled water.
(4) Steps 2 and 3 are repeated until all of the test panels are consumed.
(5) The stack is terminated with a saturated piece of filter paper topped by a 4-inch x 6-inch galvanized non-test panel having 10 pounds of weight thereon to provide a load of approximately 50 lbs./ft.$^2$.

The stack remains assembled for 22 days and then the panels are removed and inspected. The panel surfaces coated with a composition of this invention are substantially unaltered, scattered areas (1–5%) of white corrosion being revealed upon close inspection. The uncoated panel surfaces contain white corrosion over the entire surface area and contain heavy white corrosion deposits over 90% of the surface area.

Still another application of the compositions of this invention is the treatment of metal articles coming into contact with food or other edible substances. Such articles include, for example, food cans, food-serving trays, cooking utensils, medicine containers, kitchen appliances, etc. These articles are commonly made of iron, aluminum, tin or galvanized metal. A critical consideration to the treatment of such articles is that the protective coating must be chemically inert to the edible substance and must be stable to heat and pressure. The composition of this invention is found to be well suited for use as the protective coating for such articles. In this use it is advantageous first to prepare a solution of the phosphorus, containing composition of this invention in a volatile solvent such as is described previously and apply such solution to the metal either before or after the metal article is shaped or formed. The metal surface to which the solution has been applied is allowed to dry at any suitable temperature so as to remove the volatile solvent. The resulting metal surface usually contains from about 25 milligrams to about 200 milligrams, preferably from 50 milligrams to about 100 milligrams, per square foot (i.e., 0.0929 square meter) of the phosphorus-containing composition of this invention as the protective coating. Another coating of paint or lacquer may optionally be deposited on the treated metal surface.

A convenient method of applying the phosphorus-containing composition to the metal surface involves passing a metal coil stock through a roller coating mechanism in which the metal surface is coated with the composition by means of a roller at a suitable temperature such as from about 25° C. to about 250° C. Alternatively, the metal stock may first be formed such as by a drawing process to the desired shape and the shaped article may then be treated with the phosphorus-containing composition of this invention. For example, a metal can may first be made and then subjected to a spraying process whereby a solution of the phosphorus-containing composition in a volatile solvent is sprayed on to the interior wall of the can. The treated can is then dried.

An especially useful formulation for the treatment of such metal articles is a solution of the phosphorus-containing composition of this invention in a volatile solvent such as butyl alcohol, methyl Cellosolve, butyl Cellosolve, acetone, methylethyl ketone, benzene, toluene, naphtha or ethyl acetate. The concentration of the phosphororus-containing composition in the solution usually ranges from 5% (by weight) to about 80%. Concentrations outside this range likewise are useful and the optimum concentration depends on the desired fluidity of the final solution and the equipment used in treating the metal surface. A specific example of the treatment of metal articles is as follows: An aluminum coil stock is roller coated with a solution of 20% (by weight) of the phosphorus containing product of Example 1 in butyl Cellosolve so that a coating of 60 milligrams is deposited per square foot (0.0929 square meter) of the metal surface and the resulting treated stock is maintained at 80° C. until butyl Cellosolve is evaporated. The stock is then used in making aluminum cans for food stuff such as beers, vegetables, or fruit. Another example of the treatment involves spraying, such as by means of an airless spray means, an already formed aluminum can with a solution containing 25% (by weight) of the phosphorus-containing composition of Example 1 in toluene or methyl ethyle ketone and then heating the can at 60–100° C. to evaporate the volatile solvent.

Aside from the corrosion-proofing and other coating aspects hereinbefore mentioned, the compositions of this invention have other utilities. They may be used as caulking compounds or in conventional caulking compounds as improving agents. These compositions also form into solid plastic articles when heated for extended periods of time at elevated temperatures, e.g., 30 minutes at 300° C. When used in these functions, the compositions of this invention are usually associated with little or no solvent.

What is claimed is:

1. A coating composition comprising in combination a major proportion of a siccative organic coating composition and from about 0.01% to about 99% by weight of the total composition, exclusive of volatile materials, of a phosphorus-containing composition prepared by the process which comprises reacting at a temperature of at least about 50° C. a mixture comprising from about 1 to about 15 moles of a benzene polycarboxylic reactant having at least 2 carboxylic groups selected from the class consisting of acid and anhydride groups; from about 1 to about 15 moles of a polyhydroxy compound selected from the class consisting of polyhydric alcohols and polyhydric phenols; and about 1 mole of a phosphorus acid reactant selected from the class consisting of phosphorus pentoxide, phosphoric acid, and mixtures thereof.

2. A metal article coated with a coating composition according to claim 1.

3. An aluminum-containing article having on its surface a coating comprising a phosphorus-containing composition according to claim 1.

4. An article according to claim 3 wherein the benzene polycarboxylic reactant is trimellitic anhydride, the polyhydroxy compound is an alkanediol, and the phosphorus acid reactant is phosphorus pentoxide.

5. A method of protecting an alminum-containing article which comprises depositing on its surface a coating of a phosphorus-containing composition according to claim 1.

6. A method of preparing an aluminum-containing article which comprises depositing on the surface of aluminum containing stock a coating of a phosphorus containing composition according to claim 1 and then forming said stock to produce a finished aluminum-containing article.

7. A method of preparing an aluminum-containing article which comprises forming said article from an aluminum-containing stock and thereafter depositing on the surface a phosphorus-containing composition according to claim 1.

8. An aluminum-containing article having on its surface a coating comprising a phosphorus-containing composition prepared by the steps of (A) forming an intermediate by reacting a mixture comprising from about 1 to about 15 moles of a benzene polycarboxylic reactant having at least 2 carboxylic groups selected from the class consisting of acids and anhydride groups and from about 1 to about 15 moles of a polyhydroxy compound selected from the class consisting of polyhydric alcohols and polyhydric phenols, and (B) reacting the intermediate of (A) with about 1 mole of a phosphorus acid reactant selected from the class consisting of phosphorus pentoxide, phosphoric acid, and mixtures thereof.

9. An aluminum-containing article having on its surface a coating comprising a phosphorus-containing coating composition prepared by the process comprising the steps of (A) forming an intermediate by reacting about 3 moles of trimellitic anhydride with about 7.5 moles of neopentyl glycol at a temperature of at least about 130° C., and (B) reacting the intermediate of (A) with about 1 mole of phosphorus pentoxide at a temperature of at least about 100° C.

References Cited

UNITED STATES PATENTS

| | | | |
|---|---|---|---|
| 2,272,668 | 2/1942 | Honel | 260—75 |
| 2,939,857 | 6/1960 | Bolton et al. | 260—47 |
| 3,055,865 | 9/1962 | Craig | 260—47 |
| 3,131,115 | 4/1964 | Robitschek et al. | 260—75 |
| 3,239,581 | 3/1966 | Raichle et al. | 260—75 |
| 3,291,867 | 12/1966 | Shew et al. | 260—980 |

FOREIGN PATENTS

| | | |
|---|---|---|
| 670,958 | 9/1963 | Canada. |
| 891,704 | 3/1962 | Great Britain. |
| 963,966 | 7/1964 | Great Britain. |

DONALD E. CZAJA, *Primary Examiner.*

R. W. GRIFFIN, *Assistant Examiner.*

U.S. Cl. X.R.

260—20, 29.2, 30.6, 32.4, 32.6, 32.8, 33.2, 33.4, 33.6, 40, 47, 843, 850, 860, 873; 117—132, 161, 167; 148—6.15, 6.27, 31.5

UNITED STATES PATENT OFFICE
CERTIFICATE OF CORRECTION

Patent No. 3,415,766     Dated December 10, 1968

Inventor(s) Woodrow W. Jedlicka

It is certified that error appears in the above-identified patent and that said Letters Patent are hereby corrected as shown below:

In column 19, line 43, "major proportion of a siccative organic coating" should read --siccative organic coating--.

Signed and sealed this 4th day of January 1972.

(SEAL)
Attest:

EDWARD M. FLETCHER, JR.
Attesting Officer

ROBERT GOTTSCHALK
Acting Commissioner of Patents